United States Patent [19]

Syrigos

[11] Patent Number: 4,721,959

[45] Date of Patent: Jan. 26, 1988

[54] MONOPULSE COMPARATOR FORMED IN A MILLED CHANNEL PLATE STRUCTURE

[75] Inventor: Harry D. Syrigos, Malden, Mass.

[73] Assignee: Alpha Industries, Inc., Woburn, Mass.

[21] Appl. No.: 679,379

[22] Filed: Dec. 7, 1984

[51] Int. Cl.[4] .......................... H01P 5/16; G01S 13/00

[52] U.S. Cl. .................................... 342/153; 333/117; 333/120; 333/159; 333/248; 342/427

[58] Field of Search ............... 333/117, 120, 122, 137, 333/113, 114, 157, 159, 239, 248; 343/16 M, 5 NQ; 342/371-373, 380, 382, 379, 384, 427, 776-778, 853, 153

[56] References Cited

U.S. PATENT DOCUMENTS

| | | | |
|---|---|---|---|
| 2,454,530 | 11/1948 | Tiley | 333/159 |
| 2,652,535 | 9/1953 | Walker | 324/95 |
| 3,108,237 | 10/1963 | Reuvers et al. | 333/157 X |
| 3,157,847 | 11/1964 | Williams | 333/248 X |
| 3,277,489 | 10/1966 | Blaisdell | 343/777 |
| 3,308,468 | 3/1967 | Hannan | 343/16 M X |
| 3,344,424 | 9/1967 | Hacker | 343/16 M |
| 3,495,191 | 2/1970 | Zilkoski | 333/159 |
| 3,999,151 | 12/1976 | Baldwin et al. | 333/114 |

FOREIGN PATENT DOCUMENTS

| | | | |
|---|---|---|---|
| 733359 | 7/1955 | United Kingdom | 333/239 |

*Primary Examiner*—Eugene R. LaRoche
*Assistant Examiner*—Benny T. Lee
*Attorney, Agent, or Firm*—Charles Hieken

[57] ABSTRACT

A monopulse comparator is formed by milling grooves in opposed surfaces of aluminum circular blocks. The milled grooves define a number of waveguides, ports and hybrid junctions. A, B, C and D ports are coupled by respective waveguides to respective side branches in first and second hybrid rings. The series branches of these hybrid rings are coupled by respective waveguides to parallel and series branches respectively of a third ring hybrid ring. One side branch of this hybrid ring is coupled to an azimuth differential port by one of the waveguides. The other side branch is coupled to a termination by a waveguide. The parallel branches of the first and second hybrid rings are coupled by respective waveguides to respective side branches of a fourth hybrid ring. The parallel branch of this hybrid ring is coupled by a waveguide to the elevation differential port. The series branch of this hybrid ring is coupled by a waveguide to the sum port. There are four cavities beside each waveguide coupling a respective A, B, C and D port to a side branch with a Rexolite tab adjustable in each cavity.

9 Claims, 7 Drawing Figures

FIG. 2
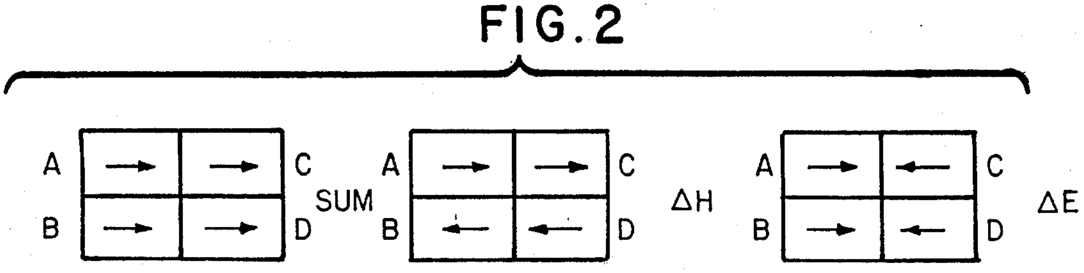
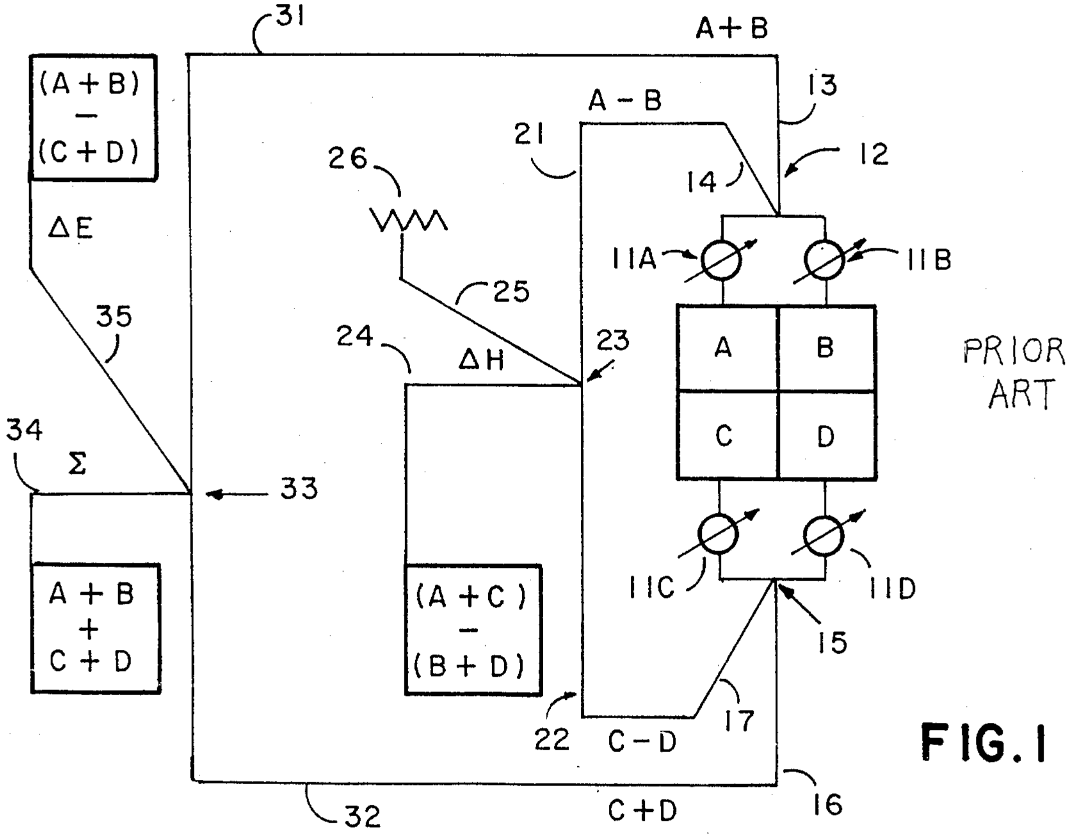
FIG. 1

MONOPULSE COMPARATOR FORMED IN A MILLED CHANNEL PLATE STRUCTURE

The present invention relates in general to monopulse comparators and more particularly concerns novel apparatus and techniques for providing at millimeter wavelengths monopulse comparators characterized by a marked reduction in size and weight with improved accuracy while facilitating manufacture at relatively low cost with automatic equipment.

A monopulse radar system provides a complete measurement of the target's angular position from a single echo pulse and may obtain, with a range measurement performed with the same echo pulse, complete determination of the target position in three dimensions. A monopulse radar uses two pairs of feed points typically located at the antenna spaced along mutually orthogonal lines intersecting at the antenna center for determining both azimuth and elevation information. The two feeds for determining azimuth information are located in the same horizontal plane on either side of the beam axis. The respective main lobes are directed slightly to the left and right, respectively, of the beam axis so that a target located exactly on the beam axis produces the same signal in both feeds, but a target located to one side of the beam axis produces a stronger signal in one feed than the other. The difference between the signals received by the two feeds is representative of the azimuth separation between the beam axis and the line of sight to the target. Similarly, the two elevation feeds are located in the same vertical plane above and below the beam axis with the difference between the signals received by the two elevation feeds indicating the elevation separation between the beam axis and the line of sight to the targets. The sum of the signals received by the four feeds indicates the gross signal strength and may be used as a normalizing factor and for processing to determine target detection and range.

The same antenna system may also be used for transmission by connecting the four feed points in parallel.

Although the sum and difference signals can be formed after conversion to a lower frequency, it is advantageous to obtain the sum and difference signals at the carrier frequency to avoid errors introduced by subsequent circuits. A typical approach uses a combination of hybrids to provide the sum and difference signals.

It is an important object of this invention to provide an improved monopulse comparator.

According to the invention, there are first and second parallel conducting plates, at least one of which is formed with milled grooves so that when the plates are fastened together, the grooves define a plurality of transmission lines that function as intercoupled hybrids between a first set of ports, typically four, for exchanging energy with associated antenna feeds, and a second set of ports, typically three ports for providing azimuth, elevation and sum signals. Both conducting plates carry milled grooves so that when the two grooved plates are fastened together with the grooved sides facing each other, the groove lengths are contiguous in and register. According to another feature of the invention, there are a plurality of cavities milled beside a transmission path groove near a port for receiving an insulating tab, such as made of Rexolite, that may be adjusted to provide a desire phase shift to allow for trimming and optimum accuracy.

Numerous other features, objects and advantages of the invention will become apparent from the following specification when read in connection with the accompanying drawing in which:

FIG. 1 is a diagrammatic representation of a monopulse comparator helpful in understanding the invention;

FIG. 2 is a diagrammatic representation helpful in understanding the vector relationships among the four ports determined by the comparator to produce sum, azimuth difference, and elevation difference information;

Figure 3:
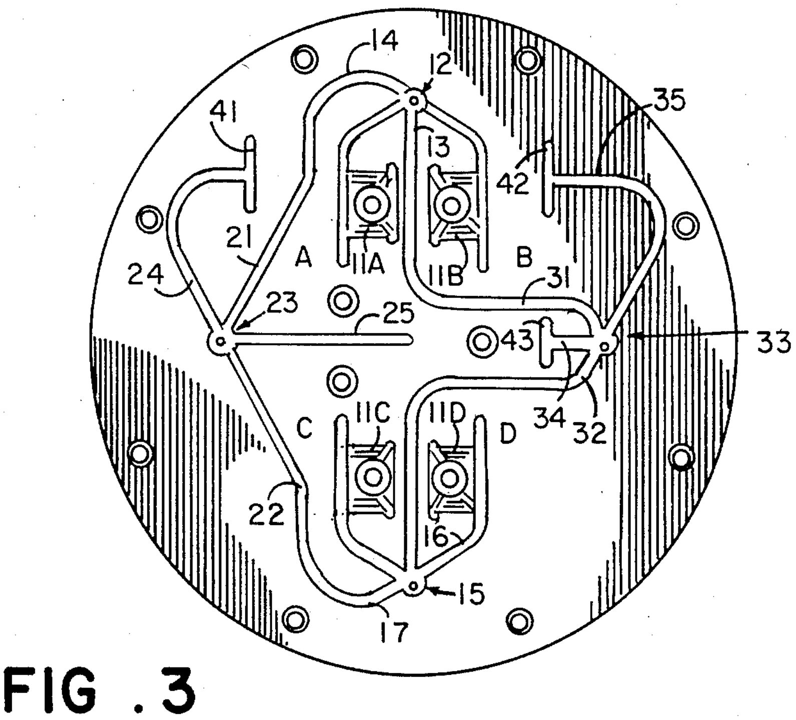
FIGS. 3 and 4 are plan views of the two plates exposing the groove surfaces.

With reference now to the drawing, and more particularly FIG. 1 thereof, there is shown a diagrammatic representation of a monopulse comparator arithmetic network for providing sum, differential azimuth and differential elevation information by combining signals from four ports designated A, B, C and D. The four ports may be regarded as associated with four beams each centered at the corner of a square centered about the antenna axis. Ports A and C are associated with beams in vertical alignment on one side of the square while ports C and D are associated with beams on the other side of the square in vertical alignment. The beams associated with ports A and B will then be in horizontal alignment separated from the beams associated with ports B and D in horizontal alignment by the antenna center axis.

Referring to FIG. 2, there is shown a representation of the vector additions to provide the sum signal by adding in phase the signals at all four branches, he azimuth differential signal (ΔH) formed by adding the signals at ports A and C in phase and at B and D in phase and differentially combining the resultant pair of vectors. Similarly, elevation differential, or (ΔE), is determined by adding the signals at ports A and B in phase and the signals at ports C and D in phase and differentially combining these resultants.

FIG. 1 diagrammatically represents these combinations. The signals from ports A and B are coupled by phase shifters 11A and 11B to hybrid junction 12 that provide their cumulative combination on branch 13 and their differential combination on branch 14. Similarly ports C and D are coupled by phase shifters 11C and 11D to hybrid junction 15 which provides their cumulative combination on branch 16 and their differential combination on branch 17.

Lines 21 and 22 couple the signals from branches 14 and 17, respectively, to hybrid junction 23 which provides their cumulative combination on branch 24, the remaining branch 25 being terminated by impedance 26. Lines 31 and 32 couple branches 13 and 16 to hybrid junction 33 which provides the cumulative combination of the signals on these branches on branch 34 as the sum signal and their differential combination on branch 35 as the elevation differential signal ΔE. The typical prior art approach for embodying this structure uses four separate hybrid junctions and phase shifters.

Figure 4:
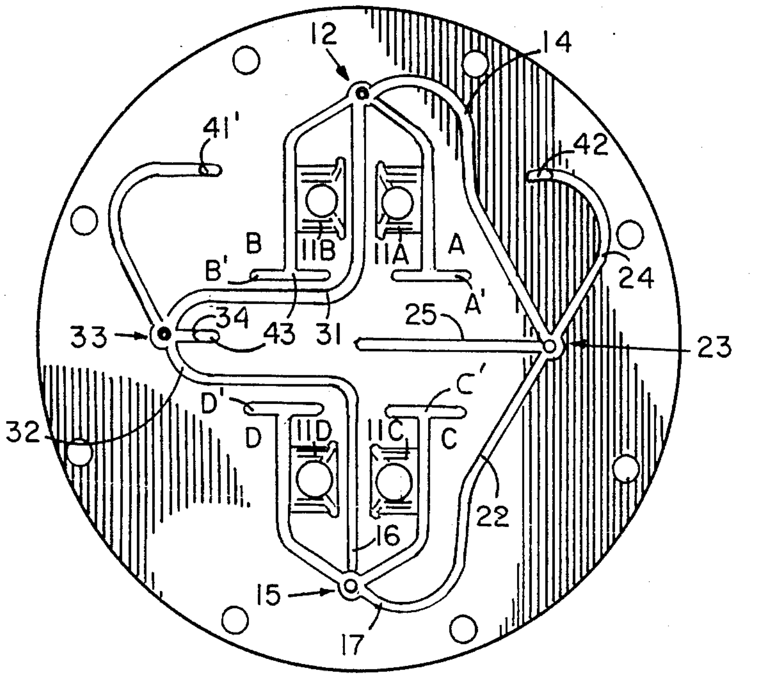

Referring to FIGS. 3 and 4, there are shown plan views of grooved plates made on an automatic milling machine having four phase shifter cavities beside the lines leading from each of ports A, B, C and D, designated respectively 11A, 11B, 11C and 11D. Corresponding elements are identified by the same reference symbols throughout the drawings. The invention implements the monopulse comparator system shown in FIG. 1. The various branches have been identified with corresponding reference symbols to facilitate associating the paths, phase shifters and hybrid junctions in FIGS. 3 and 4 with corresponding elements in FIG. 1. The grooved plates in FIGS. 3 and 4 largely represent mirror images of each other except that the end of each line opposite a port terminates in the center of a perpendicular groove that forms the cap of a T, the cap facing a port. Thus caps A', B', C' and D' face openings defining ports A, B, C and D. Similarly, caps 41, 42 and 43 face openings 41', 42' and 43' that form the azimuth differential, summation and elevation differential ports, respectively.

Hybrid junctions 12, 15, 23 and 33 are hybrid rings with a branch such as 13 feeding the parallel branch of hybrid 12 and ports A and B each connected to a side branch with the series branch being connected to branch 14. Energy applied to a parallel branch is equally divided between the side branches in phase. Energy applied to a series branch is equally divided between the side branches in phase opposition.

The invention may be contructed by machining them from small split blocks of aluminum, typically 3.00" in diameter X 0.375" thick for 94 GHz and 3.500" X 0.750" for 35 GHz. A computerized milling machine may be used to achieve very close control of the machining tolerances. One machine used to make the invention has a control system output resolution of 0.00039" and has infinitely variable feed rates from 0.1 to 99.9 in./min. with a positioning accuracy of ±0.001 in. on each of three axes with repeatability of ±0.0005 in. The milling machine approach with these tolerances reduces tolerance errors in the 94 GHz comparator according to the invention to ±0.001 in. and allows great flexibility in the layout of complex waveguide runs and in the integration of components. The equipment also facilitates reproducing parts accurately at high speed and relatively low cost.

For optimum performance, the signals at all four of ports A–D are preferably matched in amplitude to 0.25 dB and in phase to 3°. This is a difficult task because a 3° phase differential is equivalent to a length of 0.0013 inch with WR-10 waveguide at 94 GHz. Each line much either be matched to 0.001 inch up to the radiating feed, or be compensated with phase trimmers. Each hybrid must be amplitude balanced to less than 0.1 dB, including variations in the waveguide width to meet this performance criteria. Similar amplitude and phase imbalances can be introduced in the feed distribution lines of the monopulse comparator assembly as they approach the feed. To avoid such imbalance, a feature of the present invention resides in forming the feed distribution lines on the top of the plate of FIG. 4 as shown in FIG. 5.

Figure 5:
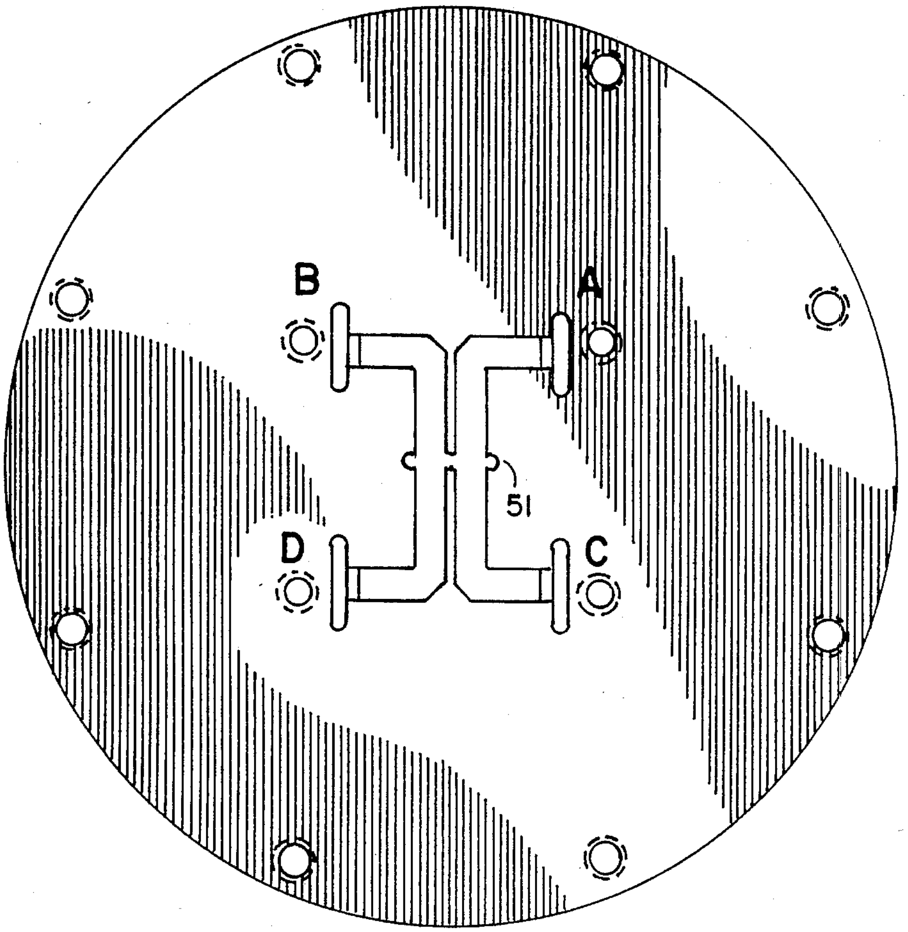
FIG. 5 is a plan view of the outside of the plate of FIG. 3 showing the channels intercoupling the four feed ports.

Referring to FIG. 5, there is shown the other side of the plate of FIG. 3 showing ports A, B, C and D with the channels joining them coupled to a small cluster 51 near the center for proper feed horn excitation. This structure enables the four balanced ports A, B, C and D to be distributed from their wide separation inside the comparator to a small cluster for proper feed horn excitation. The signals may then be exchanged with a multimode scalar feed horn through a sensitive resonant cavity, the horn throat being circular and large enough to accommodate the $HE_{11}$ mode for the sum, and the $HE_{01}$ and $HE_{21}$ modes for the difference modes. This scalar feed horn is the TRG multimode scalar feed commercially available from Alpha Industries, Inc. of Woburn, Massachusetts.

Figure 6:
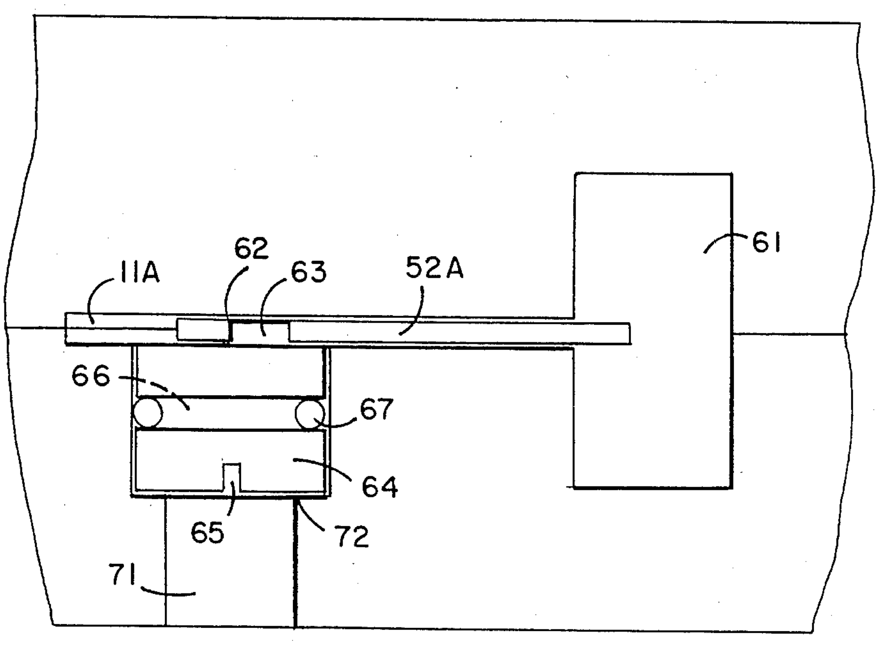
FIG. 6 is a sectional view through the assembled plates of FIGS. 3 and 4 showing phase shifting structure.

Referring to FIG. 6, there is shown an enlarged fragmentary sectional view through cavity 11A with the plates of FIGS. 3 and 4 assembled. The degree of penetration of Rexolite tab 52A into the cavity determines the phase shift imparted to the signal to the associated port. Thus, the invention may be adjusted for minimum phase differential among the energy at the different ports.

Figure 7:
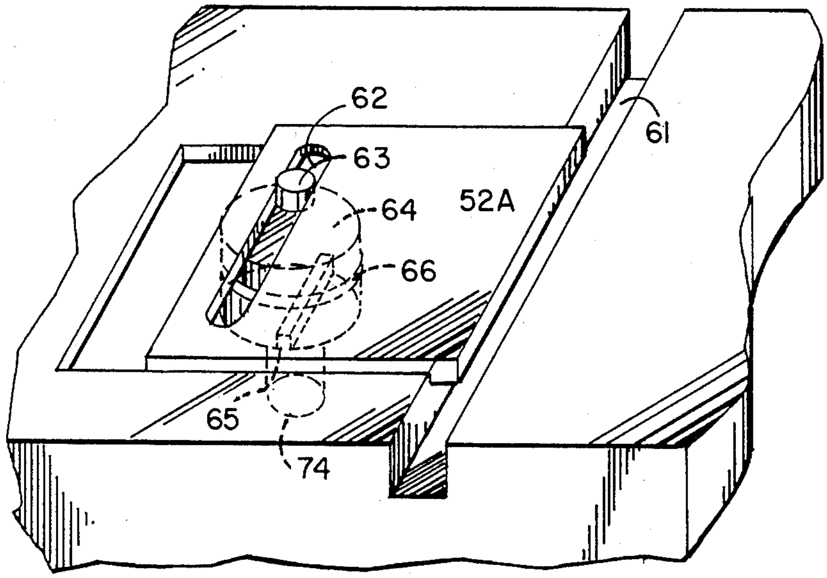
FIG. 7 is an enlarged fragmentary perspective view of the phase-shifting structure of FIG. 6.

Referring also to FIG. 7, there is shown an enlarged fragmentary perspective view of cavity 11A and associated components illustrating the adjusting mechanism. Rexolite tab 52A resides in cavity 11A adjacent to waveguide 61. Tab 52A is formed with a slot 62 parallel to waveguide 61 for accommodating an eccentric stud 63 on one face of cylindrical member 64 having a slot 65 in its other end surface. A circumferential annular groove 66 accommodates O-ring 67, typically made of neoprene, for frictionally engaging cylindrical member 64 and the inside of the stepped opening 71 in which cylindrical member 64 is seated.

With the plates assembled as shown, cylindrical member 64 fits snugly between the upper plate and the shoulder 72 of opening 71. Operation is as follows. A small screwdriver entering opening 71 accesses slit 65 to allow rotation of cylindrical member 64. As cylindrical member 64 is rotated, stud 63 moves to and from waveguide 61 while riding in slot 62 to correspondingly advance or withdraw Rexolite tab 52A to and from, respectively, waveguide 61. The more of tab 52A that extends into waveguide 61, the greater the delay imparted to wave energy traveling along waveguide 61. O-ring 67 maintains the desired setting. The specific adjustment may be determined by using conventional electrical measurements for monopulse systems.

Cap grooves, such as 41 and 42 (FIGS. 3,4), at the end of a line function as housings for ramp-like terminations to direct energy along a path or propagation perpendicular to the plane of the plates for external coupling.

There has been described novel apparatus and techniques for a monopulse comparator. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims:

What is claimed is:

1. Microwave apparatus for propagating microwave energy comprising, first and second conducting plates, at least one of said first and second conducting plates being formed with a plurality of grooves therein to coact with the other of said plates to define a plurality of waveguide channels and a plurality of ports, at least two of said ports being intercoupled by at least one of the grooved waveguide channels, at least one cavity formed beside a groove in said at least one plate for imparting controllable phase shift to microwave energy propagating in an adjacent groove, mechanically adjustable means for selectively penetrating into said cavity for controlling the phase shift imparted thereby and comprising a tab of dielectric material seated in said cavity adjacent an associated waveguide channel and formed with a slot, a cylindrical member, having an axis, seated in an opening of said at least one of said plates, adjacent said cavity and having an eccentric stud seated in said slot, means for rotatably supporting said cylindrical member in said opening to allow rotation about said axis while restricting axial movement thereof, and means for rotating said cylindrical member to cause said eccentric stud to control the penetration of said tab into said associated waveguide while riding in said slot.

2. Microwave apparatus in accordance with claim 1 wherein both said first and second plates are formed with said plurality of grooves to establish a plurality of opposed grooves, grooves on said first conducting plate being in register and contiguous with associated plurality of grooves on said second conducting plate to define said waveguide channels and said ports by means including said opposed grooves.

3. Microwave apparatus in accordance with claim 1 wherein said cylindrical member is formed with a circumferential annular groove and further comprising, an O-ring seated in said circumferential groove for frictionally engaging said cylindrical member and the wall surrounding the opening in which said cylindrical member is seated for maintaining said cylindrical member in a selected position.

4. Microwave apparatus in accordance with claim 3 wherein said cavity extends into both said first and second plates.

5. Microwave apparatus having a plurality of beam radiators for propagating microwave energy comprising, first and second conducting plates, at least one of said first and second conducting plates being formed with a plurality of grooves therein to coact with the other of said plates to define a plurality of waveguide channels, at least four hybrid junctions, and a plurality of ports, a plurality of cavities formed beside respective grooves in said at least one plate for imparting controllable phase shift to microwave energy propagating in an adjacent groove, mechanically adjustable means for selectively penetrating into each of said cavities for controlling the phase shift imparted thereby, said hybrid junctions each having a pair of side branches, a series branch and a parallel branch, at least four of said ports for exchanging microwave energy with respective ones of said beam radiators, at least three others of said ports for providing summation, azimuth differential and elevation differential information from the microwave energy, first and second ones of said at least four ports coupled by respective ones of said waveguide channels to respective side branches of a first one of said hybrid junctions, third and fourth ones of said at least four ports coupled by respective ones of said waveguide channels to respective side branches of a second one of said hybrid junctions, series branches of said first and second hybrid junctions coupled by respective ones of said waveguide channels to series and parallel branches respectively of a third one of said hybrid junctions, one of the side branches of said third hybrid junction being coupled by one of said waveguide channels to a termination, the other side branch of said third hybrid junction being coupled by one of said waveguide channels to one of said elevation differential and azimuth differential ports, said waveguide channels coupling the parallel branches of said first and second hybrid junctions to respective side branches of the fourth one of said hybrid junctions, the parallel branch of said fourth hybrid junction being coupled by one of said waveguide channels to the other of said azimuth differential and elevation differential ports, the series branch of said fourth hybrid junction being coupled by one of said waveguide channels to said sum port.

6. Microwave apparatus in accordance with claim 5 wherein said hybrid junctions are hybrid rings.

7. Microwave apparatus in accordance with claim 5 wherein said plurality of cavities comprise at least first, second, third and fourth cavities beside the waveguide channels coupling said first, second, third and fourth ports to respective side branches of said first and second hybrid junctions, said mechanically adjustable means associated with each of said cavities comprising means for controlling the phase shift imparted by a respective cavity to energy transmitted by an associated waveguide.

8. Microwave apparatus in accordance with claim 7 wherein said mechanically adjustable penetrating means comprises, a tab of dielectric material seated in a cavity adjacent an associated waveguide and formed with a slot therein, a cylindrical member, having an axis, seated in an opening of at least one of said first and second conducting plates adjacent said cavity and having an eccentric stud seated in said slot, means for rotatably supporting said cylindrical member in said opening to allow rotation about said axis while restricting axial movement thereof, and means for rotating said cylindrical member to cause said eccentric stud to control the penetration of said tab into said associated waveguide while riding in said slot.

9. Microwave apparatus in accordance with claim 8 wherein said cylindrical member is formed with a circumferential annular groove and further comprising, an O-ring seated in said circumferential annular groove for frictionally engaging said cylindrical member and the wall surrounding the opening in which said cylindrical member is seated for maintaining said cylindrical member in a selected set position.

* * * * *

UNITED STATES PATENT OFFICE
CERTIFICATE OF CORRECTION

Patent No. 4,721,959 Dated January 26, 1988

Inventor(s) Harry D. Syrigos and Don Crossland

It is certified that error appears in the above-identified patent and that said Letters Patent are hereby corrected as shown below:

Title page:

"Inventor:" should read -- Inventors: and add -- Don Crossland, Derry, N. H. --.

Item [19] "Syrigos" should read --Syrigos et al

Signed and Sealed this

Twenty-eighth Day of June, 1988

Attest:

DONALD J. QUIGG

Attesting Officer

Commissioner of Patents and Trademarks